Dec. 12, 1950     F. R. FISHER     2,533,446
LIFE BELT HAVING A COMPRESSED GAS INFLATION CYLINDER
Filed July 7, 1948
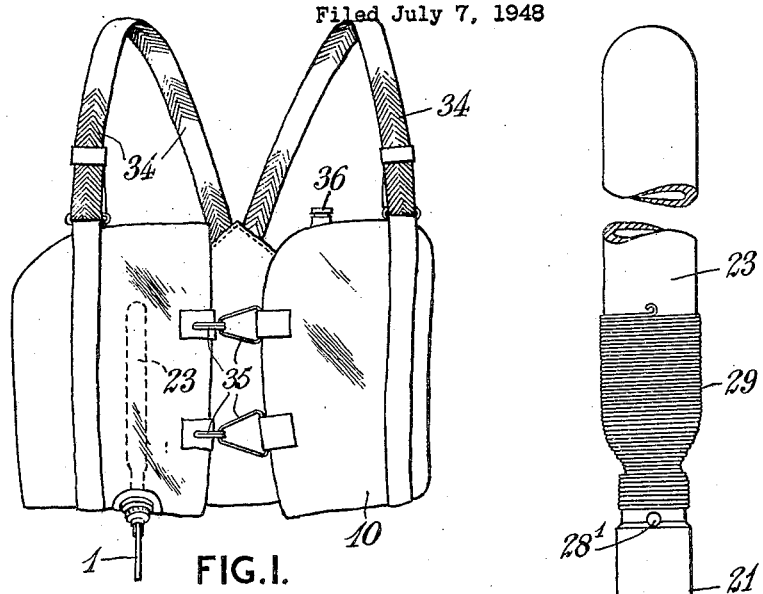
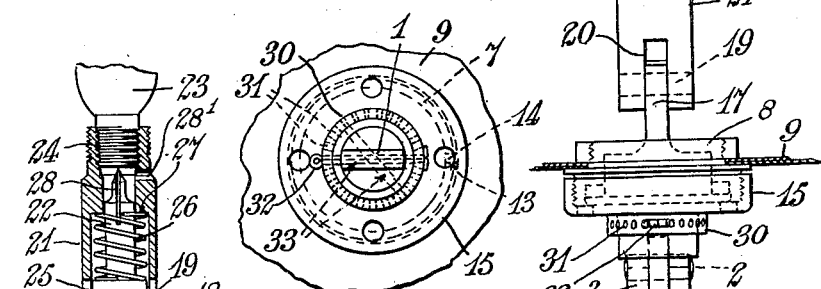
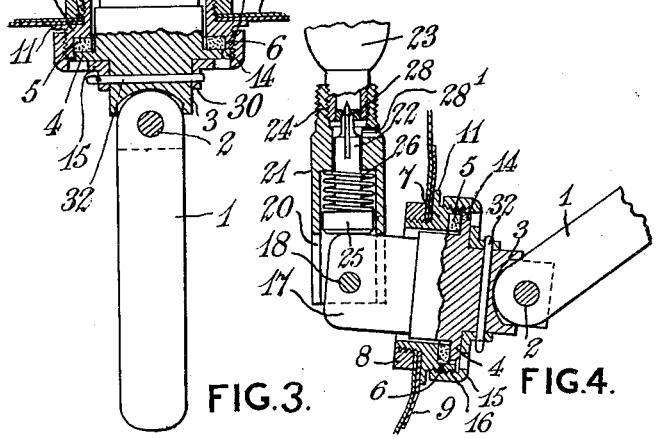
INVENTOR
*Felix R. Fisher*
BY *Corbett, Mahoney & Miller*
ATTORNEYS Patented Dec. 12, 1950

2,533,446

UNITED STATES PATENT OFFICE 2,533,446

LIFE BELT HAVING A COMPRESSED GAS INFLATION CYLINDER

Felix R. Fisher, Streatham Hill, England

Application July 7, 1948, Serial No. 37,364
In Great Britain July 17, 1947

6 Claims. (Cl. 9—19)

This invention relates to improvements in means for locking valves or closures in fluid tight position and more particularly but not necessarily, to valves or seals used in lifebelts of the type which are adapted to be instantaneously inflated for use in the case of accidents on, for instance, aeroplanes, flying boats or the like when passing over the sea.

Lifebelts of this type usually comprise an inflatable body belt carried by shoulder straps, the ends of the belt being adapted to be connected together in front of the wearer by hook and eye fastenings and to be inflated by a charging cylinder disposed vertically within the belt and adapted to be perforated to charge the belt by knocking up an arm formed on a cam member adapted to engage a perforating plunger, the belt being so shaped in front as to keep the wearer's head clear of the water and face upwards.

Heretofore the arm operated cam member has been formed with a screwed cap adapted to be screwed into a sleeve fitted in the lower edge of the lifebelt and it has been found that this cap cannot always be screwed down on to a washer to form an airtight seal or joint so that the arm will be in such a position as to be knocked up readily to operate the perforating of the plunger and it has been necessary to provide means such as a wire connector to retain it in its operating position.

One object of the present invention is to so design the cam member and its connection with the lifebelt that the above and other objections will be overcome so that the lifebelt will be more efficient in operation.

A further object is to provide means which will hold the arm in its correct operative position and effectively and positively lock the seal against vibration or inadvertent opening.

With these and other objects in view the invention consists in providing means for locking valves or closures in a fluid tight position comprising a screw threaded cap for connection with a screwed sleeve having a seating for a washer, an arm carrying member having formed thereon a flange for engaging the washer and to form a fluid tight seal when the cap is screwed on the sleeve, means for securing the screwed sleeve to a flexible body member or container, cam means on said arm carrying member for operating a valve or for opening a closure of a charging device and means for positively locking the cap to the arm carrying member whereby a fluid-tight joint can be provided with the arm so mounted as to be in a predetermined position for operation.

One form of the invention will now be described with reference to the accompanying drawing in which:

Fig. 1 is a perspective view of a lifebelt showing the inflating means therefore;

Fig. 2 is an elevation of the inflation means drawn to a larger scale and showing part of the lifebelt.

Fig. 3 is a sectional elevation thereof;

Fig. 4 is a similar view to Fig. 3 showing the inflation means in operative position and Fig. 5 is an inverted plan.

According to one form of this invention as shown in the drawing and applied to a lifebelt as hereinbefore described the operating arm 1 thereof of any desired length and adapted to depend normally downwardly is freely connected by means of a fulcrum pin 2 to a cylindrical member 3 formed with a washer engaging flange 4 to co-operate with a washer 5 mounted in a recess 6 formed in a screwed sleeve 7 adapted to be secured by a nut 8 in the lower edge 9 of a lifebelt 10. This sleeve 7 is formed at an intermediate position with a flange 11 whereby the edge of the aperture 12 in the lifebelt 10 will be engaged between the flange 11 and the nut 8. This screwed sleeve 7 is formed with a slot or recess 13 to receive a lug or projection 14 on the washer engaging flange 4 whereby the arm 1 will be retained in a suitable position for instant operation. On the cylindrical member 3 is mounted a cap member 15 which is adapted to screw onto a thread 16 formed on the screwed sleeve 7 so that the washer engaging flange 4 will seat in the recess 6 to provide a fluid tight joint or valve like closure through the medium of the washer 5. The cylindrical member 3 carrying the washer engaging flange 4 held against rotation by the lug or projection 14 positioned in the recess 13 is formed with a cam like extension 17 having an aperture 18 for a fulcrum pin 19 fitted in a forked end 20 of an elongated sleeve 21 disposed within the lifebelt 10. Within this elongated sleeve 21 is slidably mounted a perforating plunger 22 for the charging cylinder 23 of usual form screwed at 24 into the upper end of the said elongated sleeve 21. This plunger 22 is formed with a head 25 which is held normally on to the cam like extension 17 by a coiled spring 26. This spring 26 has an abutment against the upper face of the head 25 and another against a step flange 27 in the bore of the sleeve 21. The side of the plunger 22 is formed with a groove 28 for the escape of the charge such as highly compressed $CO_2$ from the charging cylinder 23 when perforated. A vent hole 28' is formed in the sleeve 21 for the escape of the charge into the lifebelt 10. Means such as a two dimensioned coiled spring 29 is provided to prevent inadvertent unscrewing of the charging cylinder 23. In order to lock the cap member 15 in various positions of adjustment when screwed up to form the fluid tight seal the said cap 15 is formed on its face with a concentric flange 30 having a number of apertures 31 for the reception of a split pin or the like 32 which passes through an aperture 33 formed diametrically in the cylindrical member 3. A difficulty in using this type of seal is that its stopping position for a fluid tight seal cannot be pre-determined owing to the minute variations in the thickness of the washers used. It is therefore preferable that the cylindrical member 3 be formed with more than one diametrical aperture 33, arranged at different angles to each other. The apertures 31 on the cap member 15 and those formed diametrically in the cylindrical member 3 are so arranged that the number of degrees at which this locking device can be locked at pre-determined positions is known, although the position of the cap 15, after clamping the flange 4 onto the washer 5, cannot be pre-determined. For instance if 24 apertures are formed in the flange 30 and only one through aperture 33 is formed in the cylindrical member 3, the cap 15 can be locked at every 15 degrees of its rotation. But if a second through aperture 33 is provided at an angle to the first, the cap 15 can be locked at intermediate positions, for example, at 7½ degrees apart, or by further adjusting the angle of the second through aperture on the cylindrical member 3 the cap 15 can be locked every five or ten degrees between the fifteen degrees of the apertures in the cam member. In this way it is possible to lock the cap member 15 at five degrees as either one or the other of the through apertures 33 in the cylindrical member 3 will be in alignment with the apertures 31 on the cap member 15. Obviously the number of apertures on the flange of the cylindrical member can be so increased as to enable the cap to be locked in a less number of degrees of rotation, and if a double row of apertures is formed in the flange 30 of the cap 15, the top row of apertures being intermediate of the lower row, the number of locking positions can be greatly increased. Thus the operating arm 1 can be arranged in such a position that it can be easily operated. This arm 1 may be fixed horizontally by screwing into the side of the cylindrical member 3 and the cam may be modified to operate when moved in one direction only but is preferably fulcrummed so as to be free to swing in one direction or the other. Thus in the event of the lifebelt 10 being put on inside out as in the case of panic the arm 1 will be so positioned that it can be readily knocked up to perforate the charging cylinder 23. The lifebelt 10 fitted with the improved inflating means is of the known type as shown in Fig. 1 and comprises an inflatable body belt portion, shoulder straps 34 and front fastening means 35. The charging cylinder 23 is indicated by dotted lines. The body belt is also fitted with a mouth piece valve 36 for use in the event of failure of the charging cylinder and for deflating the belt.

It will be seen that the construction is such that the charging cylinder 23 and its perforating mechanism can be readily withdrawn for inspection and that when replaced an airtight joint will be formed by screwing the cap 15 on the sleeve 7 to engage the flange 4 co-operating with the washer 5 in the recess and fitting the split pin 32 to lock the cap 15 in its adjusted position. Further the arm 1 will be retained in such a position by the lug 14 engaging in the recess 13 that the said arm 1 can be readily knocked up by the wearer outwardly of the lifebelt when it is necessary to inflate the same. In use such as in the case of an emergency the lifebelt is easily fitted by passing the arms through the shoulder straps and connecting the hook and eye fastening means. The belt can be readily inflated by placing one hand on the belt over the charging cylinder and knocking up the arm with the other hand until the cam turns on its fulcrum to operate the plunger to perforate the charging cylinder. It will be seen that as the operating arm 1 depends freely from the belt it can be equally well operated if the belt is placed on inside out.

It will be understood that the invention may be applied for sealing and locking valves or other washered closures on flexible body members or containers such as for instance where it is desirable to provide a fluid tight seal with an operating arm or handle disposed in a predetermined position. In such cases the arm 1 instead of being freely suspended it may be rigidly attached to project at right angles to the valve in the manner previously described.

What I claim is:

1. In a combination with a life-belt having flexible walls and adapted to be inflated by gas under pressure from a charging cylinder disposed within the life-belt and having a sealed end adapted to be perforated to permit the escape of gas into the life-belt, a sleeve upon which the sealed end of the charging cylinder is removably supported, a perforating plunger mounted in said sleeve and movable to perforate the sealed end of the charging cylinder, a cam member pivoted in a forked end of said sleeve and in engagement with said plunger so that pivotal movement of the cam member relative to the sleeve will move said plunger, means for mounting said cam member on one of the flexible walls of the life-belt, said means including a cylindrical member which carries said cam member, a sleeve disposed within an opening in said flexible wall and in which said cylindrical member is disposed, means for clamping the last-named sleeve to the said wall at the edge of the opening and including a nut threaded on the inner end of said sleeve and a flange provided on said sleeve outside said wall between which the wall is clamped, said sleeve having its outer end beyond said flange also threaded, a cap member threaded on the outer threaded end of said sleeve, said cap member being provided with an outwardly projecting flange surrounding a central opening, said cylindrical member having a portion extending through said opening, a laterally extending flange on said cylindrical member engaged by said cap and disposed within a washer-receiving socket formed within said last-named sleeve at the outer end thereof, a sealing washer disposed within said socket and engaged by said lateral flange, an operating arm pivoted to said extending portion of said cylindrical member for limited swinging movement, and means for locking said cylindrical member in a fixed position in said last-named sleeve, said means including a lug formed on the edge of said lateral flange and extending into a recess formed in the outer edge of such sleeve and a pin passing through a diametrical opening in said extending portion of said cylindrical member and a pair of aligning diametrically opposed openings in said outwardly projecting flange of said cap, a plurality of pairs of said openings being formed in said flange at various angular positions and a plurality of openings being formed in said extending portion at various angular positions.

2. In combination with a life-belt having flexible walls and adapted to be inflated by gas under pressure from a charging cylinder disposed within the life-belt and having a sealed end adapted to be perforated to permit the escape of gas into the life-belt, a sleeve upon which the sealed end of the charging cylinder is supported, a perforating plunger mounted in said sleeve and movable to perforate the sealed end of the charging cylinder, a cam member pivoted to said sleeve and in engagement with said plunger so that pivotal movement of the cam member relative to the sleeve will move said plunger, means for mounting said cam member on one of the flexible walls of the life-belt, said means including a cylindrical member which carries said cam member, a sleeve disposed within an opening in said flexible wall and in which said cylindrical member is disposed, means for clamping the last-named sleeve to the said wall at the edge of the opening and including a nut threaded on the inner end of said sleeve and a flange provided on said sleeve outside said wall between which the wall is clamped, said sleeve having its outer end beyond said flange also threaded, a cap member threaded on the outer threaded end of said sleeve, said cap member being provided with an outwardly projecting flange surrounding a central opening, said cylindrical member having a portion extending through said opening, a laterally extending flange on said cylindrical member engaged by said cap and disposed within a washer-receiving socket formed within said last-named sleeve at the outer end thereof, a sealing washer disposed within said socket and engaged by said lateral flange, an operating arm pivoted to said extending portion of said cylindrical member for limited swinging movement, and means for locking said cylindrical member in a fixed position in said last-named sleeve, said means including interfitting portions formed on said lateral flange and said last-named sleeve and a pin passing through a diametrical opening in said extending portion of said cylindrical member and a pair of aligning diametrically opposed openings in said outwardly projecting flange of said cap.

3. In combination with a life-belt having flexible walls and adapted to be inflated by gas under pressure from a charging cylinder disposed within the life-belt and having a sealed end adapted to be perforated to permit the escape of gas into the life-belt, a sleeve upon which the sealed end of the charging cylinder is supported, a perforating plunger mounted in said sleeve and movable to perforate the sealed end of the charging cylinder, a cam member pivoted to said sleeve and in engagement with said plunger so that pivotal movement of the cam member relative to the sleeve will move said plunger, means for mounting said cam member on one of the flexible walls of the life-belt, said means including a cylindrical member which carries said cam member, a sleeve disposed within an opening in said flexible wall and in which said cylindrical member is disposed, means for clamping the last-named sleeve to the said wall at the edge of the opening and including a nut threaded on the inner end of said sleeve and a flange provided on said sleeve outside said wall between which the wall is clamped, said sleeve having its outer end beyond said flange also threaded, a cap member threaded on the outer threaded end of said sleeve, said cap member being provided with an outwardly projecting flange surrounding a central opening, said cylindrical member having a portion extending through said opening, a laterally extending flange on said cylindrical member engaged by said cap and disposed within a washer-receiving socket formed within said last-named sleeve at the outer end thereof, a sealing washer disposed within said socket and engaged by said lateral flange, an operating arm pivoted to said extending portion of said cylindrical member for limited swinging movement, and means for locking said cylindrical member in a fixed position in said last-named sleeve, said means including a pin passing through a diametrical opening in said extending portion of said cylindrical member and a pair of aligning diametrically opposed openings in said outwardly projecting flange of said cap.

4. In combination with a life-belt having flexible walls and adapted to be inflated by gas under pressure from a charging cylinder disposed within the life-belt and having a sealed end adapted to be perforated to permit the escape of gas into the life-belt, a sleeve upon which the sealed end of the charging cylinder is supported, a perforating plunger mounted in said sleeve and movable to perforate the sealed end of the charging cylinder, a cam member pivoted to said sleeve and in engagement with said plunger so that pivotal movement of the cam member relative to the sleeve will move said plunger, means for mounting said cam member on one of the flexible walls of the life-belt, said means including a cylindrical member which carries said cam member, a sleeve disposed within an opening in said flexible wall and in which said cylindrical member is disposed, means for clamping the last-named sleeve to the said wall at the edge of the opening and including a nut threaded on the inner end of said sleeve and a flange provided on said sleeve outside said wall between which the wall is clamped, said sleeve having its outer end beyond said flange also threaded, a cap member threaded on the outer threaded end of said sleeve, said cap member being provided with an outwardly projecting flange surrounding a central opening, said cylindrical member having a portion extending through said opening, a laterally extending flange on said cylindrical member engaged by said cap and disposed within a washer-receiving socket formed within said last-named sleeve at the outer end thereof, a sealing washer disposed within said socket and engaged by said lateral flange, an operating arm pivoted to said extending portion of said cylindrical member for limited swinging movement, and means for locking said cylindrical member in a fixed position in said last-named sleeve, said means including a pin passing through a diametrical opening in said extending portion of said cylindrical member and a pair of aligning diametrically opposed openings in said outwardly projecting flange of said cap, a plurality of pairs of said openings being formed in said flange at various angular positions and a plurality of openings being formed in said extending portion at various angular positions.

5. In combination with a life-belt having flexible walls and adapted to be inflated by gas under pressure from a charging cylinder disposed within the life-belt and having a closure at one end which is adapted to be opened to permit the escape of gas into the life-belt, a member upon which the charging cylinder is supported, means carried by said supporting member adapted to be actuated to open said closure, an actuating member pivoted to said supporting member for actuating said last-named means, an attaching unit for securing said actuating member in an opening formed in one of the flexible walls of the life-belt, said unit including a sleeve clamped to said wall and in which said actuating member is disposed, a sealing member between said sleeve and said actuating member, a collar on said sleeve rotatable to clamp the sealing member between said sleeve and said actuating member, said actuating member having a portion extending through said collar and relative to which the collar can rotate, an arm pivoted to said portion for limited swinging movement, and means for locking said actuating member in a fixed position within said sleeve, said means comprising interfitting portions formed on said sleeve and actuating member to prevent relative rotation and a pin extending transversely through an opening in said extending portion of said actuating member and through aligned opposed openings in said collar.

6. In combination with a life-belt having flexible walls and adapted to be inflated by gas under pressure from a charging cylinder disposed within the life-belt and having a closure at one end which is adapted to be opened to permit the escape of gas into the life-belt, a member upon which the charging cylinder is supported, means carried by said supporting member adapted to be actuated to open said closure, an actuating member pivoted to said supporting member for actuating said last-named means, an attaching unit for securing said actuating member in an opening formed in one of the flexible walls of the life-belt, said unit including a sleeve clamped to said wall and in which said actuating member is disposed, a sealing member between said sleeve and said actuating member, a collar on said sleeve rotatable to clamp the sealing member between said sleeve and said actuating member, said actuating member having a portion extending through said collar and relative to which the collar can rotate, an arm pivoted to said portion for limited swinging movement, and means for locking said actuating member in a fixed position within said sleeve, said means comprising a pin extending transversely through an opening in said extending portion of said actuating member and through aligned opposed openings in said collar.

FELIX R. FISHER.

REFERENCES CITED

The following references are of record in the file of this patent:

UNITED STATES PATENTS

| Number | Name | Date |
|---|---|---|
| 1,230,290 | Geiger | June 19, 1917 |
| 1,621,458 | Campbell | Mar. 15, 1927 |
| 2,041,662 | Mapes | May 19, 1936 |